United States Patent [19]

Kim et al.

[11] Patent Number: 5,418,633
[45] Date of Patent: May 23, 1995

[54] MULTILAYERED LIQUID CRYSTAL DISPLAY WITH TRANSPARENT COLUMNS DISPOSED WITHIN PIXEL AREAS

[75] Inventors: Joon-heon Kim; Woo-ho Choi, both of Seoul, Rep. of Korea

[73] Assignee: Samsung Electronics Co., Ltd., Kyungki-do, Rep. of Korea

[21] Appl. No.: 169,244

[22] Filed: Dec. 20, 1993

[30] Foreign Application Priority Data

Dec. 28, 1992 [KR] Rep. of Korea ............... 1992-25752

[51] Int. Cl.⁶ ............... G02F 1/133; G02F 1/1333; G02F 1/1339
[52] U.S. Cl. ........................ 359/53; 359/79; 359/81
[58] Field of Search ............... 359/53, 62, 79, 81, 359/51

[56] References Cited

U.S. PATENT DOCUMENTS

| | | | |
|---|---|---|---|
| 3,886,014 | 5/1975 | Bayer | 156/145 |
| 4,581,608 | 4/1986 | Aftergut et al. | 340/704 |
| 4,659,182 | 4/1987 | Aizawa | 350/339 F |
| 4,813,770 | 3/1989 | Clerc et al. | 350/347 E |
| 4,878,741 | 11/1989 | Fergason | 350/339 F |
| 5,113,272 | 5/1992 | Reamey | 359/53 |

FOREIGN PATENT DOCUMENTS

5-134266   5/1993   Japan ................... 359/94

*Primary Examiner*—Anita Pellman Gross
*Assistant Examiner*—Charles Miller
*Attorney, Agent, or Firm*—Robert A. Westerlund; Stephen R. Whitt; Charles R. Donohoe

[57] ABSTRACT

A liquid crystal display device includes laminated plural electrical field effect type liquid crystal layers with light-transmitting electrically insulating layers inserted therein, and liquid crystal injection holes for forming the columns for supporting the insulation layers and the liquid crystal layers. The structure of the liquid crystal display device is changed in the manner that the columns are striped so as to increase the width thereof and the liquid crystal injection holes are rod-shaped so as to increase the section width thereof. Accordingly, the gap of the liquid crystal layers is maintained and the etching time for dissolution layers is considerably reduced, thereby improving the structural quality of the liquid crystal display device and obtaining a uniformly displayed image.

26 Claims, 8 Drawing Sheets

MULTILAYERED LIQUID CRYSTAL DISPLAY WITH TRANSPARENT COLUMNS DISPOSED WITHIN PIXEL AREAS

BACKGROUND OF THE INVENTION

The present invention relates to a liquid crystal display device which is used in an optical display device, and more particularly, to a light-scattering type liquid crystal display device having multiple liquid crystal layers isolated by multiple electrical insulation layers.

In general, since a liquid crystal display device consumes a small amount of electricity due to its low driving voltage, such devices have recently undergone remarkable development and application fields thereof have also been extensively diversified. In a currently utilized liquid crystal display (LCD) device, since an active matrix type LCD device using a simple matrix or thin film transistor (TFT) uses a twisted nematic (TN) type or super twisted nematic (STN) type liquid crystal, at least a polarizer for controlling light, is required. However, while controlling the light, the polarized plate in the LCD intercepts more than 50% of the emitted light. Accordingly, efficiency in the use of light is severely curtailed.

Therefore, in order to obtain a picture having a desired brightness, a background light source having high brightness is required. Thus, in the case of a laptop wordprocessor or computer which uses a dry cell battery or an accumulative battery as a power supply, extended use is limited due to the excessive power consumption of the light source.

Meanwhile, in the general LCD device including the TN or STN type liquid crystal displays, since liquid crystal fills the space between two glass plates, a cell gap which is a light-controlled area is necessary for being strictly adjusted to form a uniform picture. Due to current technological limitations in the manufacturing of the glass plate, the super-enlargement of a liquid crystal display panel is difficult to achieve.

Taking into consideration the above-mentioned problems, in order to decrease the burden of cell gap adjustment, the polarized plate should not be used to increase efficiency in the use of light, and instead, a single base plate is used. Of course, LCD devices which do not use a polarized plate have been disclosed. Examples of such an LCD without polarized plate include a cholesteric nematic transition (CNT) type which uses a phase transition effect and a dynamic scattering mode (DSM) type which was devised during early LCD development. The DSM type liquid crystal display device exhibits a slow response time and cannot be made thin, so that it is no longer in common use.

Also, another example of an LCD not using a polarized plate to increase the efficiency of light is a polymer-dispersed liquid crystal display (PDLCD). However, since the PDLCD is made of a polymer material more than 50% of whose volume is light-transmitting, the scattering of light should be brought about efficiently to obtain a clear contrast ratio. There is a structural limitation in attaining these requirements in that the thickness of the liquid crystal layer should be at least 20 μm.

The disclosure of an LCD which adopts an electrical field effect type liquid crystal having a new structure in which the above conventional problems of the LCD are considerably improved, was filed as U.S. patent application Ser. No. 08/058,712. A continuation-in-part application thereof for improved structure was filed on Aug. 24, 1993.

The above LCD has a fast driving speed and a high utilization efficiency of light, in which the liquid crystal layer provided between the opposing electrodes is isolated by a plurality of insulation layers to form a multilayer structure, the polarized plate is not used and only a single sheet of a glass substrate is employed.

Hereinbelow, the structure of the reflective type liquid crystal display device proposed above U.S. patent application Ser. No. 08/058,712 and manufacturing method thereof will be described with reference to the accompanying FIGS. 1 through 14.

FIG. 1 is a schematic perspective view of the reflective type liquid crystal display device proposed above. Multiple liquid crystal layers 22 being the electrical field effect type are provided between opposing electrodes 10 and 18 on the substrate 16. The distance between liquid crystal layers 22 is maintained by columns 12. Insulation layers 20 for separating liquid crystal layer 22 into a plurality of layers are provided between liquid crystal layers 22. The mutual location of insulation layers 20 is fixed by columns 12 which are provided locally and liquid crystal injection holes 14 for locally injecting the liquid crystal are provided in the insulation layer 20. Here, the thickness each liquid crystal layer 22 which is partitioned from the liquid crystal layer 22 is less than or equal to 3 μm and the thickness of each insulation layer 20 is preferably less than or equal to 5 μm. The insulation layer 20 can be made of an epoxy resin material, or a metal oxide, particularly an aluminum oxide.

FIG. 2 is a partly extracted plan view of the liquid crystal display device of the FIG. 1, and FIG. 3 is a cross-sectional view along line A—A' of FIG. 2. Here, electrodes 18 are disposed oil a substrate 16 in a predetermined pattern. The electrodes 18 are covered with light-transmitting electric insulation resin layer 20 and multiple liquid crystal layers 22 and electric insulation layers 20 are laminated thereon. A reference numeral 10 denotes upper electrodes which oppose lower electrodes 18, 24 denotes photoresist layers remaining after the forming process, 26 denotes light-transmitting electric insulation layers, and 11 denotes light-shielding plates positioned above columns 12.

FIG. 4 is a cross-sectional view along line B—B' of FIG. 2. In FIG. 4, a reference numeral 14 represents liquid crystal injection holes, with like parts being designated by the same reference numerals used in FIG. 3.

The manufacturing method (steps A through G) of the liquid crystal display device having the above-mentioned process is explained with reference to the accompanied FIGS. 5 through 10.

Referring to FIG. 5, first electrodes of a predetermined pattern made of a conductive material such as an indium tin oxide (ITO) is formed on a black plastic substrate 16.

Referring to FIG. 6, insulation layers 20 made of a light-transmitting resin, for example, an epoxy resin, and dissolution layers 22a made of a material such as a polyvinyl alcohol (PVA) are alternately laminated on the whole upper surface of the substrate on which first electrodes 18 are formed by spin coating method or roll coating method. Thereafter, a second electrode 10 made of a conductive material such as ITO is formed on the uppermost layer among insulation layers 20 in a predetermined pattern.

Referring to FIG. 7, photoresist layers 24 having a pattern for columns to be described later are formed on the uppermost surface of the structure of FIG. 6.

Referring to FIG. 8, the portion not covered by the photoresists are plasma-etched to form inlet holes for forming columns 12. Then, the holes are filled with an epoxy resin. The epoxy resin is coated on the laminated layers to form columns 12 and a surface insulating layer 26.

Referring to FIG. 9, liquid crystal inlet holes 14 are formed by photo mask patterning and plasma etching. Here, water, acetone or alcohol is injected via the liquid crystal inlet holes 14 to thereby dissolve and remove the dissolution layers 22a. Accordingly, cavity portions 22b are provided between the epoxy resin layers 20. Each insulating layer 20 is supported by columns 12.

Referring to FIG. 10, after a semi-processed liquid crystal display device is dried, liquid crystal is coated on the whole surface thereof under vacuum to be injected to the cavity portions 22b via the injection holes 14 to thereby form liquid crystal layer 22.

Thereafter, after liquid crystal filling process is completed, in order to seal the liquid crystal, an electric insulation layer 26 made of epoxy resin is formed. Light-shielding plates 11 are formed on the columns 12 and injection holes 14, which must be shielded from light in order to complete a liquid crystal display device.

In the aforementioned manufacturing method of the liquid crystal display device, a metal such as aluminum can be used as a material of the dissolution layer, instead the water-soluble PVA, and a light-transmitting electrically insulating resin including an acryl resin, semiconductor or metal oxide can be used as a material or the electric insulation layer, instead of the epoxy resin.

However, according to the above LCD manufacturing method, the following problems may result.

First, since considerable stress is concentrated on the central area of the light-transmitting electric insulation resin which is supported by the columns, it is difficult to maintain a constant gap size of the liquid crystal layers formed between the electrically insulating resins. Thus, a uniform picture is not obtained.

Next, when liquid crystal injection holes are formed as long inlet holes of about 10 μm in length, a solvent for etching the dissolution layers has difficulty in penetrating into the narrow holes and, accordingly, a longer etching time becomes necessary. If the time for etching becomes longer, its contact time with the electrically insulating resin and etchant is also increased. Then, an undercut portion of the insulating resin may be formed. If the etching time is shortened to prevent the undercut formation, the dissolution layers are not completely removed.

SUMMARY OF THE INVENTION

Therefore, in consideration of the above-described problems, it is an object of the present invention to provide a liquid crystal display device whose structure is improved so as to satisfactorily maintain a liquid crystal gap, by changing the structure of the columns.

In consideration of the above problems, it is another object of the present invention to provide a liquid crystal display device whose structure is improved so as to reduce the etching time of a dissolution layer and perform the etching smoothly, by changing the structure of a liquid crystal injection hole.

To accomplish the above first object, in the liquid crystal display device according to the present invention, multiple liquid crystal layers are provided on a substrate, between a group of first electrodes and a group of second electrodes which oppose each other. Multiple light-transmitting insulation layers forming the multiple liquid crystal layers are linked by means of multiple columns fixing the location thereof. Each of columns is shaped in a strip such that multiple columns are disposed in parallel to create striped pattern.

To accomplish the above second object, in the liquid crystal display device according to the present invention, multiple liquid crystal layers are provided on a substrate, between a group of first electrodes and a group of second electrodes which oppose each other. Multiple light-transmitting insulation layers separating the liquid crystal layer into multiple layers are linked by multiple columns fixing the location thereof. The multiple liquid crystal layers are linked by means of multiple liquid crystal injection holes which are vertically formed. Each or columns is shaped in a strip such that multiple columns are disposed in parallel so as to have a striped pattern. The liquid crystal injection holes are provided around the area where the columns are formed.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
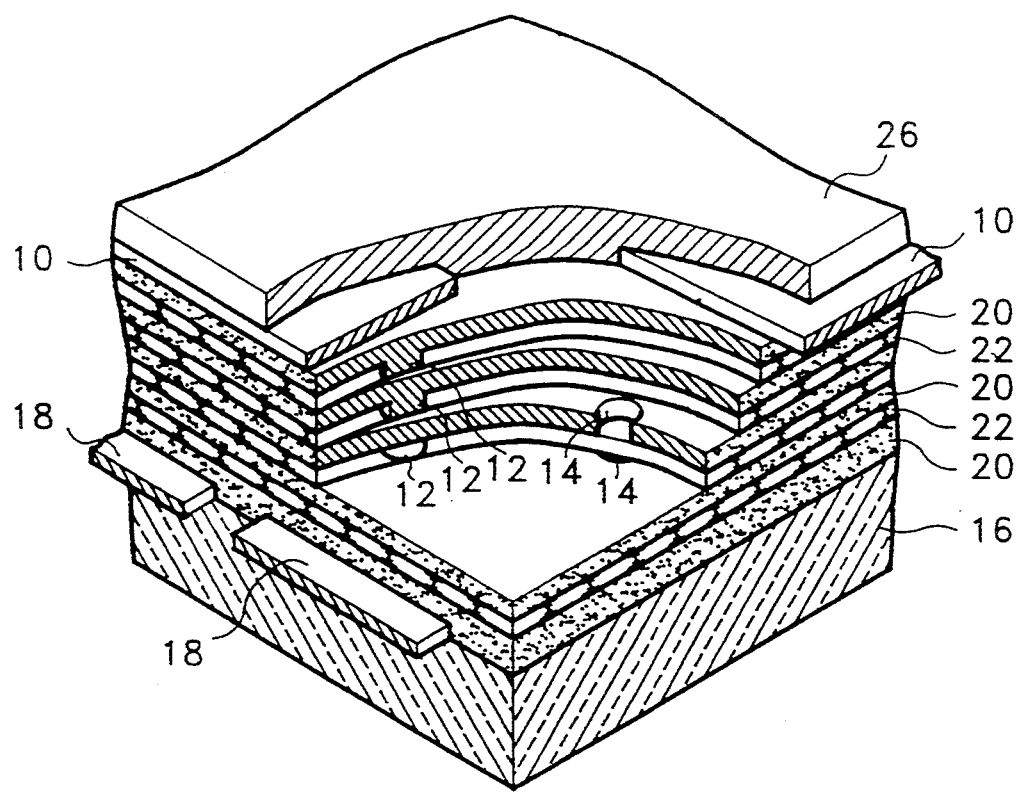
FIG. 1 is a schematic perspective view of the reflective type liquid crystal display device proposed in U.S. patent application No. 08/058,712.
Figure 2:
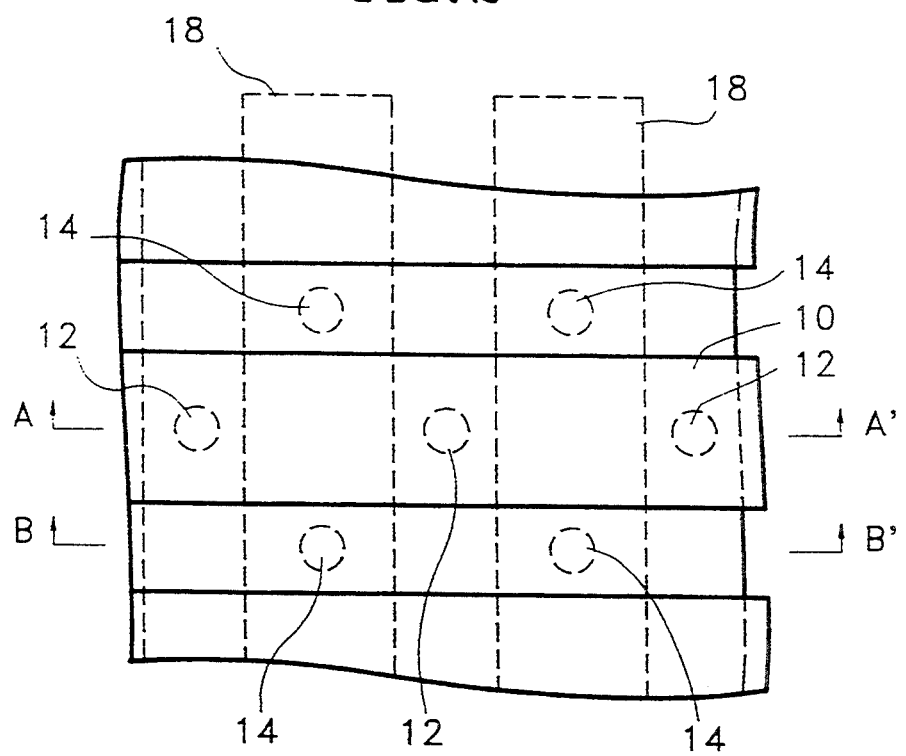
FIG. 2 is a partly extracted plan view of the liquid crystal display device shown in FIG. 1.
Figure 3:
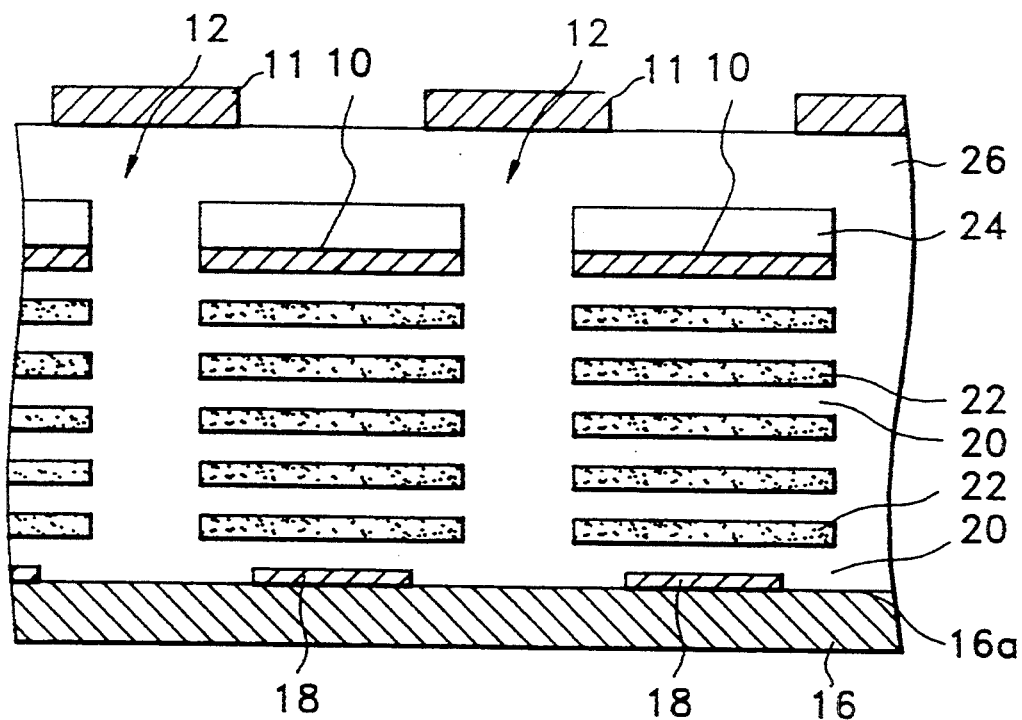
FIG. 3 is a cross-sectional view along a line A—A' of FIG. 2.
Figure 4:
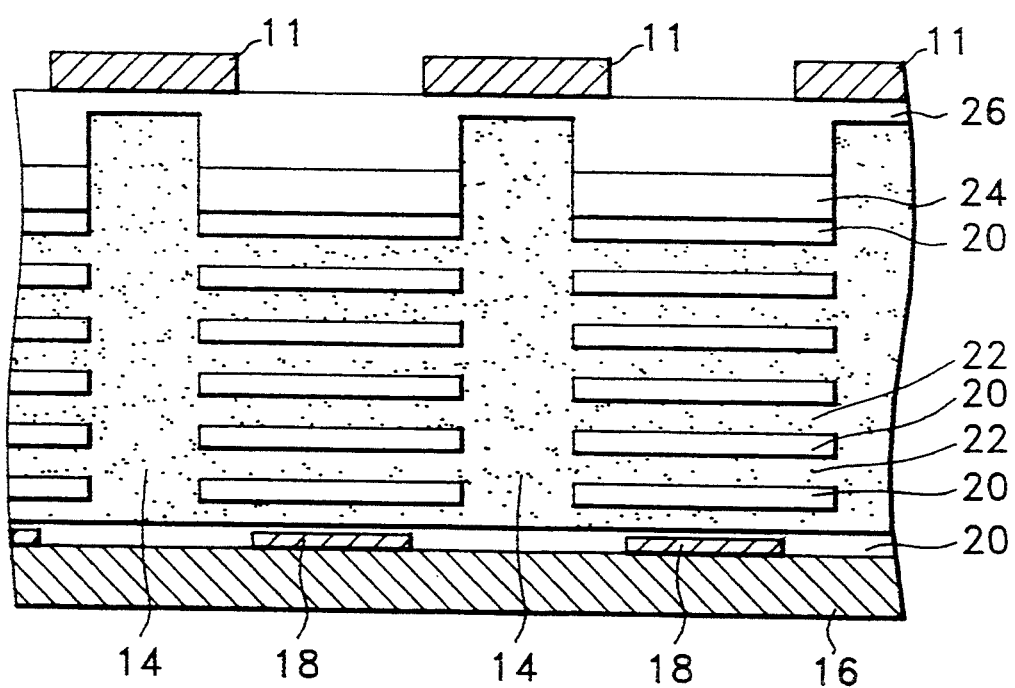
FIG. 4 is a cross-sectional view along a line B—B' of FIG. 2.
Figure 5:
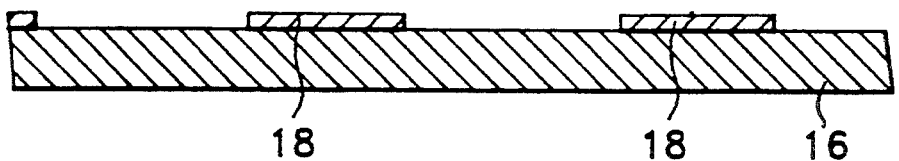
FIGS. 5 through 10 show processing states in sequence throughout the manufacturing steps of the reflective type liquid crystal display device shown in FIG. 1.
Figure 6:
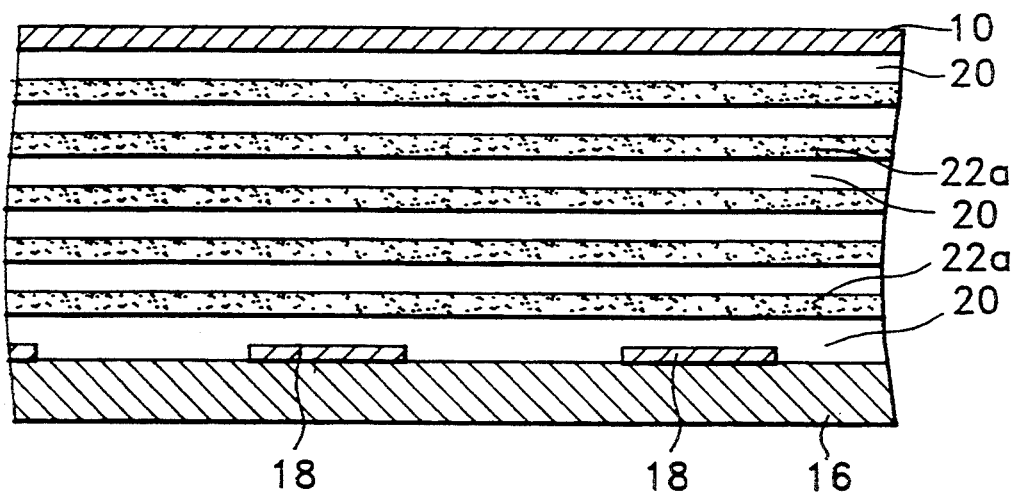
Figure 7:
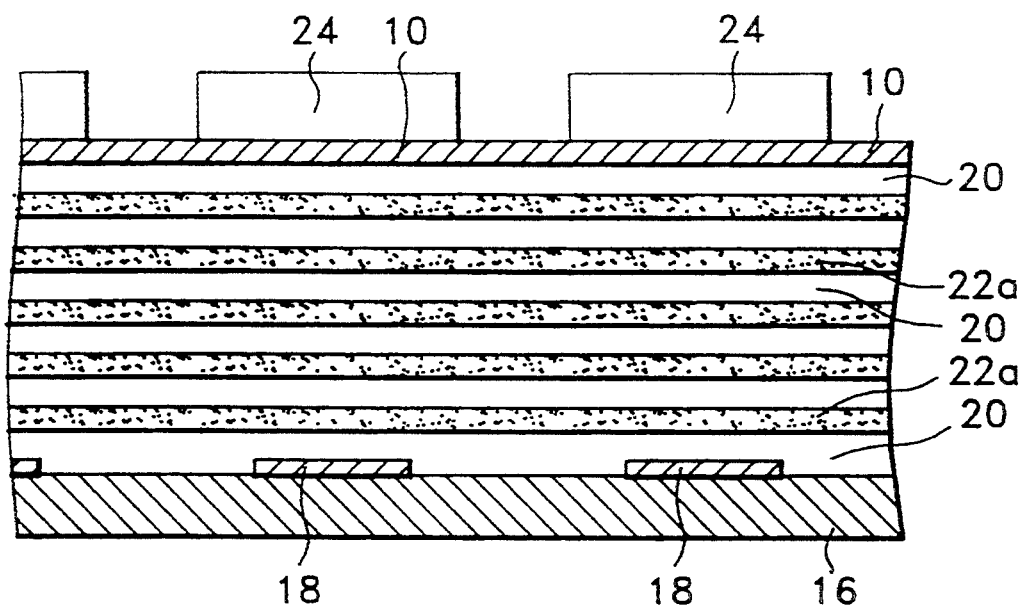
Figure 8:
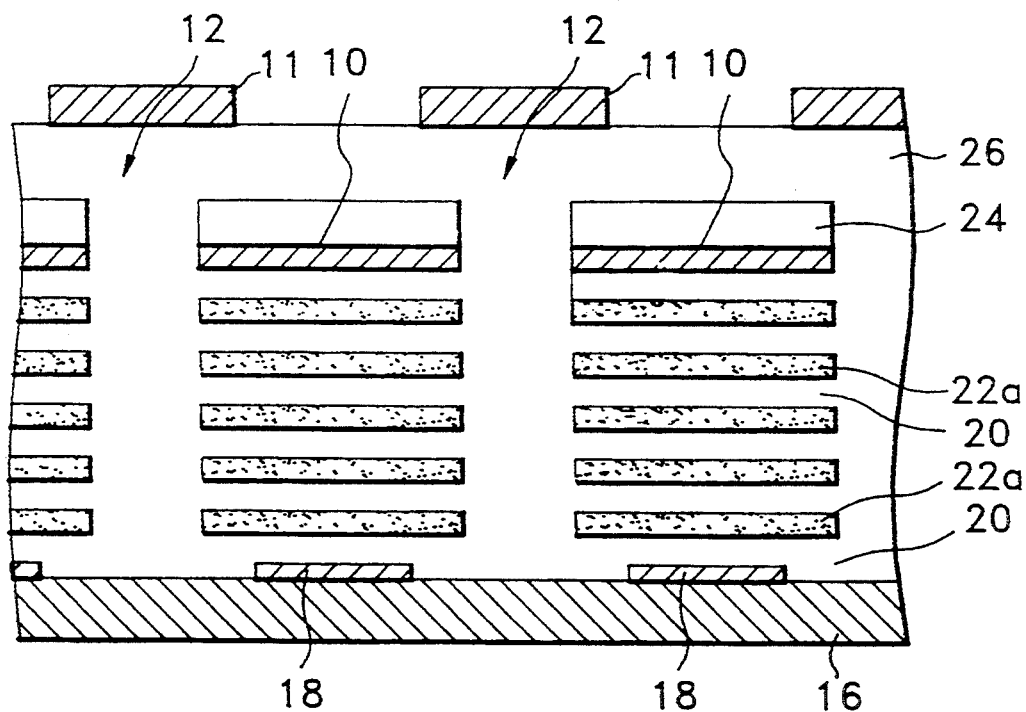
Figure 9:
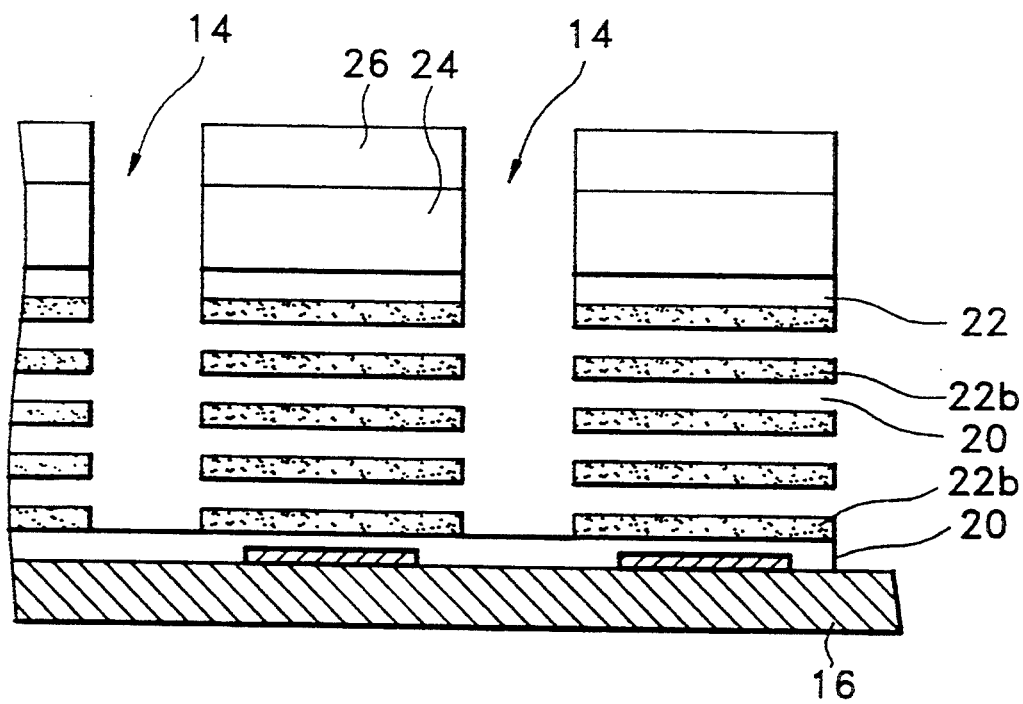
Figure 10:
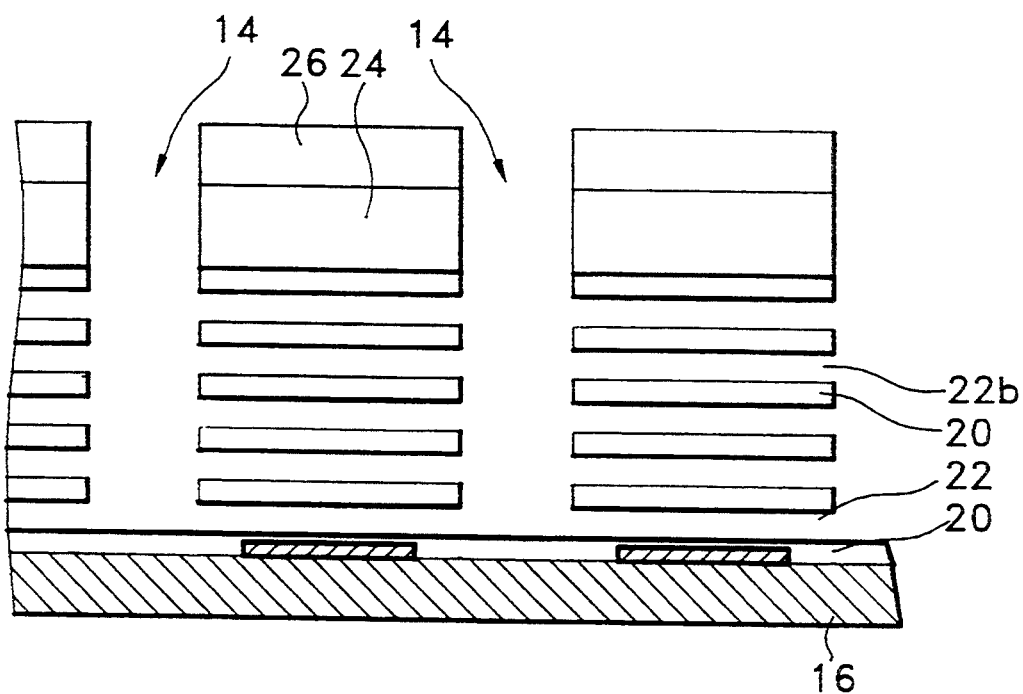
Figure 11:
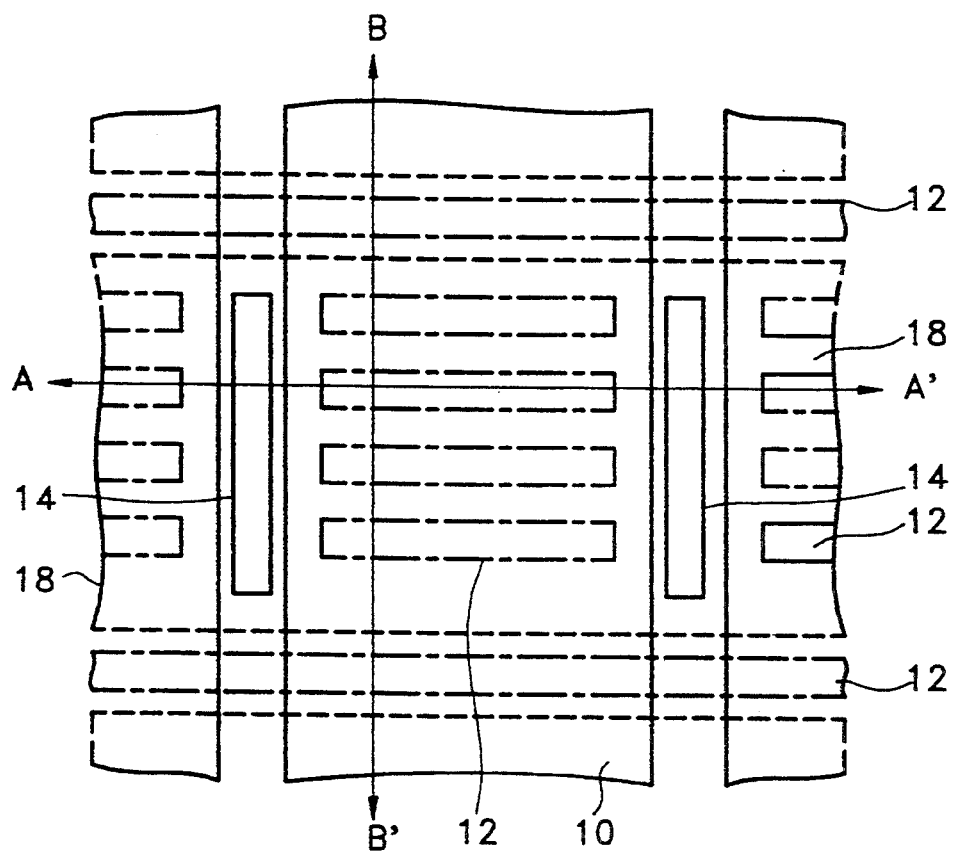
FIG. 11 is a partly extracted plan view of the liquid crystal display device according to the present invention.

FIG. 11 is an extracted plan view of unit pixels and their adjacent portions in the liquid crystal display device according to the present invention. As shown in FIG. 11, a plurality of lower first electrodes 18, represented by dashed lines, are formed in parallel, to thereby form a first electrode group, a plurality of upper second electrodes 10, represented by solid lines, are disposed in parallel so as to be perpendicular to the first electrodes to form a second electrode group. The area in which respective first and second electrodes 18 and 10 cross each other forms a pixel. A light-transmitting insulation resin and a liquid crystal layer are alternately laminated between the first electrodes 18 and second electrodes 10.

Also, columns 12 represented by clot-dashed lines are formed between adjacent first electrodes and within the pixel area where first electrodes 18 and second electrodes 10 intersect. Since each of the columns 12 is shaped in a strip, with multiple columns being disposed in parallel so as to create a striped pattern, the supporting state of the light-transmitting insulation resin is stable. The columns 12 having such a structure as described above, improves the homeostasis of the gap of liquid crystal layers by mitigating the concentrated internal stress of the insulation resins. The appropriate number and width columns 12 formed may or may not be formed within pixel area in consideration of their support functions within the limit satisfying a required (or desired) opening ratio in a liquid crystal display device.

Meanwhile, a reference numeral 14 represents liquid crystal injection holes. The liquid crystal injection holes 14 are placed between the upper electrodes, second electrodes 10 and the portion where liquid crystal is placed is where light-shielding plates are to be formed in the following step. Accordingly, since the liquid crystal injection holes 14 are formed in a striped pattern and extend longitudinally, as described in FIG. 11, the solvent penetration and the dissolved material elimination are performed quickly by the etching process in which the space for the liquid crystal to be filled up is provided. Also, since the columns 12 formed within pixel area and the liquid crystal injection holes 14 are mutually perpendicular, the solvent injected via the liquid crystal injection holes 14 flows into the pixel area smoothly.

The present invention is not limited to the structure described in the plan view of FIG. 11. That is, the columns 12 formed between the first electrodes 18 in the disclosed embodiment may be formed between the second electrodes 10 in a striped pattern. At this time, the liquid crystal injection holes 14 are formed between the first electrodes 18.

Figure 12:
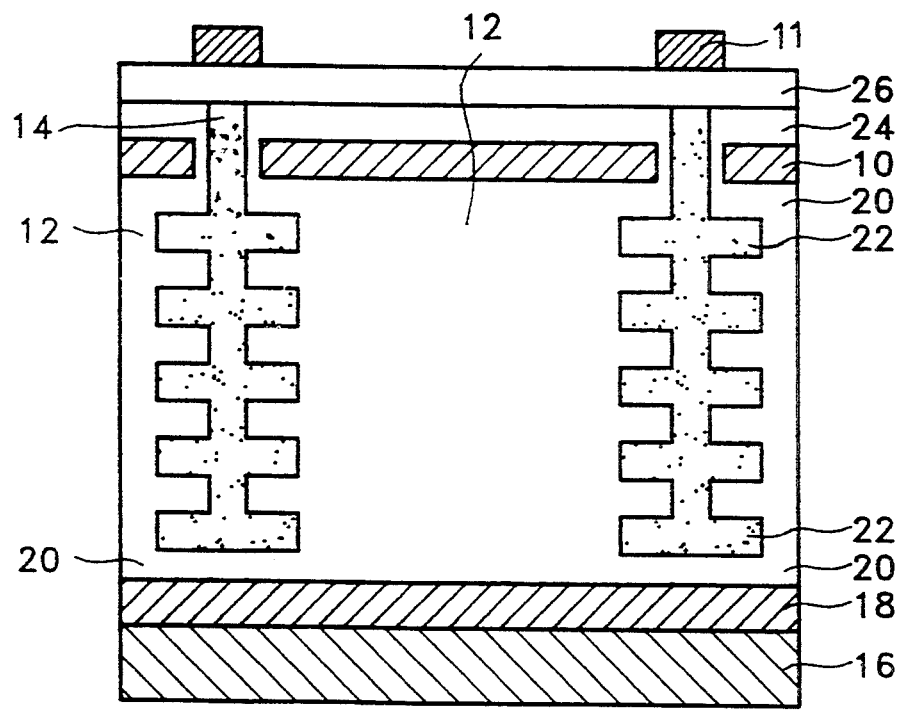
FIG. 12 is a cross-sectional view along a line A—A' of FIG. 11.

FIG. 12 is a plan view along a line A—A' of FIG. 11.

Liquid crystal layers 22 and light-transmitting insulation layer 20 are alternately laminated between first electrodes 18 and second electrodes 10. Each strip-shaped column links the light-transmitting insulation layers 20. The liquid crystal layers 22 are mutually linked by means of the liquid crystal injection holes 14.

A reference numeral 16 represents a transparent substrate for which a glass substrate or a plastic substrate can be employed, 24 and 26 represent photo-resist layer and electric insulation layer, respectively, and 11 represents light-shielding plates which intercept light transmitting pixel area externally.

Figure 13:
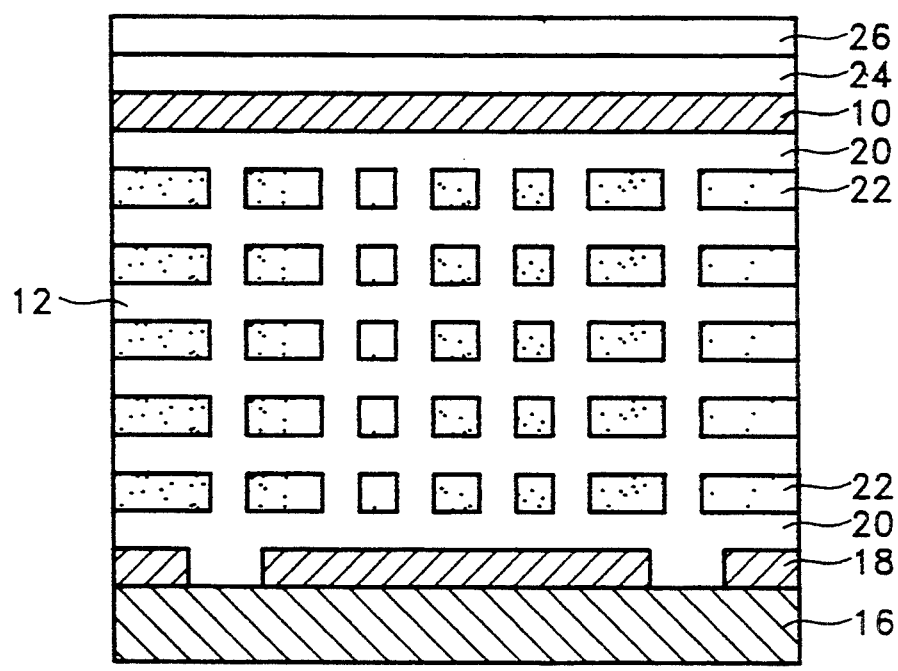
FIG. 13 is a cross-sectional view along a line B—B' of FIG. 11.

FIG. 13 is a cross-sectional view along a line B—B' of FIG. 11.

Figure 14:
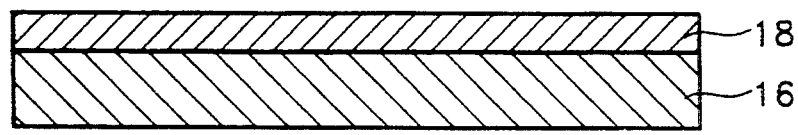
FIGS. 14 through 16 show processing states in sequence throughout the manufacturing steps of the liquid crystal display device according to the present invention.

FIGS. 14. 15 and 16 are cross-sectional views showing each step for explaining the manufacturing process of the liquid crystal display device according to an embodiment of the present invention. Hereinbelow, the manufacturing steps will be described.

Referring to FIG. 14, after an ITO layer which is a transparent conductive layer is deposited on a transparent substrate 16 in a thickness of 1.000 Å by a DC sputtering method, it is patterned in a predetermined form to form lower electrodes. i.e., a group of first electrodes 18, of the liquid crystal display device. A glass substrate or a plastic substrate can be employed as the substrate 16.

Figure 15:
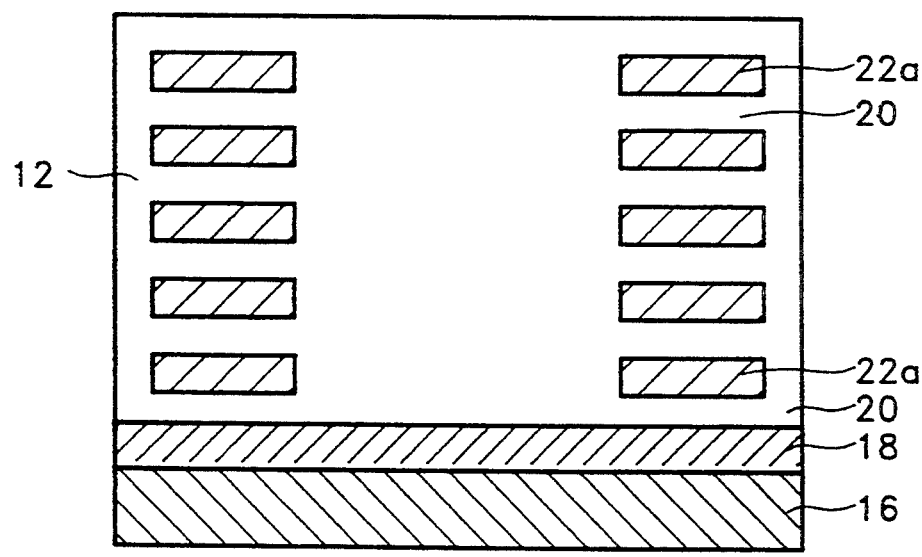

Referring to FIG. 15, light-transmitting insulation layers 20 and dissolution layers 22a made of a material which is selectively soluble to the insulation layer, are alternately laminated several times. Then, inlet holes are formed in the portions for columns to be provided and the holes are filled up with a column material to form columns 12. This process is described in detail as follows. The insulation layers 20 are light-transmitting organic resin layers for which a polyimide resin, an acryl resin, an epoxy resin, a silicon rubber, etc. can be used. After the insulation layers 20 are coated by a spin coating, a roll coating, etc., they are cured at a temperature of about 180° C. such that their thicknesses are about 4.000–6,000 Å. Also, after the dissolution layers 22a are coated by a spin coating, a roll coating, etc., they are cured at a temperature of about 180° C. such that their thicknesses are about 5,000 Å. A polyvinyl alcohol (PVA) is mainly used as a material of the dissolution layers 22a and metals such as Cr, Al, Ti, TiW and Ta can be used. The insulation layers 20 and the dissolution layers 22a may be alternately laminated more than a few times. Thereafter, the insulation layer 20 is laminated once more and then the portion for columns to be formed is etched in a predetermined pattern. At this time, a reactive ion etching (RIE) is mainly adopted and a mixed gas of $CF_4$ and $O_2$ is used. The columns are patterned to create stripes. Then, the material to form the columns is filled into the above patterned column formation portion. The column material should be a light-transmitting material which is the same material as that of the electrically insulating layer 20 or can be selectively etched for the dissolution layers 22a.

Figure 16:
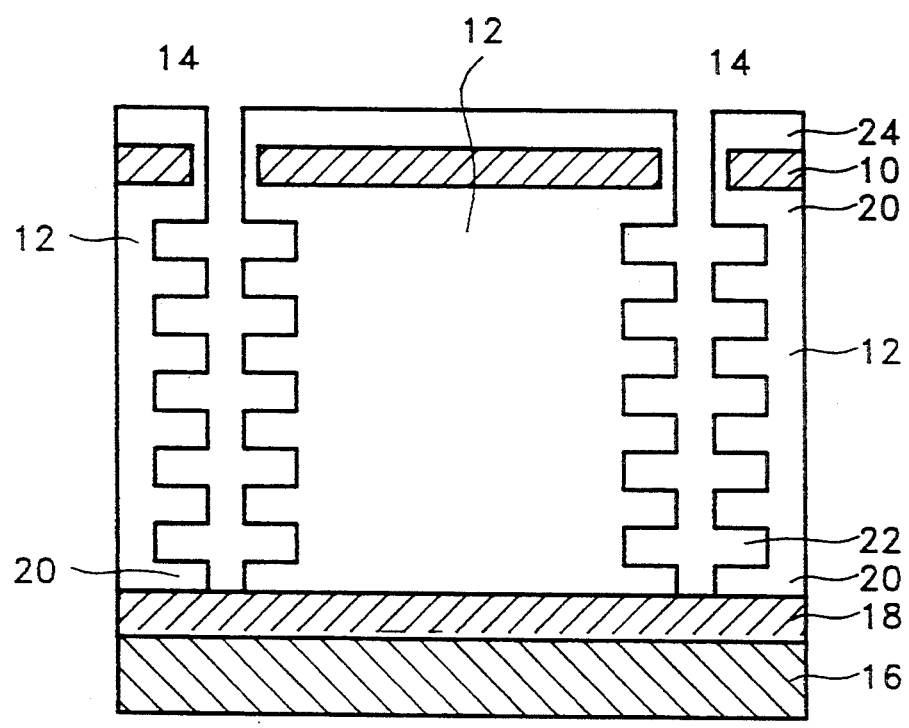

FIG. 16 shows that liquid crystal is injected to the resultant structure after the ITO layer, which is a transparent conductive layer, is deposited onto the whole surface thereof. The ITO layer is deposited in a thickness of about 1,000 Å by a DC sputtering method. Then, second electrodes 10, i.e., the upper electrodes, are patterned so as to be perpendicular to the first electrodes 18 using a conventional photographic etching technology. The liquid crystal injection holes 14 are etched in a rod-like pattern by a reactive ion etching method in the portion of the second electrodes not being formed. Here, a mixed gas of $CF_4$ and $O_2$ can be used. The dissolution layers to be etched are immersed in an etchant, for example. PR stripper. After the dissolution layers are completely dissolved to be removed, liquid crystal is injected. The electric insulation layer is laminated on the whole surface thereof to seal the liquid crystal injection holes, and light-shielding plates are formed in necessary portions.

In the liquid crystal display device according to the present invention as described above, since the columns thereof are formed in a striped pattern (not as holes), it is very advantageous in maintaining the gap of liquid crystal layers and thereby enabling the realization of a uniform image. Also, since the structure of liquid crystal injection holes is rod-like to make the maximum use of the lower part of the light-shielding plate, the etchant penetrates into dissolution layers quickly and smoothly when the dissolution layers are etched, thereby reducing etching time and protecting an overetching of the electrically insulating layer. Accordingly, a high-quality structure can be accomplished. Meanwhile, with the columns being formed within the pixel areas, the columns are made to be perpendicular to the liquid crystal injection holes to thereby cause the etchant to flow directionally and perform the etching process more smoothly.

The present invention is not limited to the above embodiment and various modifications may be made within the technological spirit thereof.

What is claimed is:

1. A liquid crystal display, comprising:
   a substrate;
   a plurality of parallel, spaced-apart first electrodes formed on said substrate, said first electrodes extending longitudinally in a first direction;
   a multilayer structure comprised of alternating light-transmissive insulating layers and liquid crystal layers, respectively, a bottommost layer of said multilayer structure comprising a first light-transmissive insulating layer formed on said first electrodes and exposed portions of said substrate, and an uppermost layer of said multilayer structure comprising a final, light-transmissive insulating layer;
   a plurality of parallel, spaced-apart second electrodes formed on said final light-transmissive insulating layer, said second electrodes extending in a second direction perpendicular to said first direction, wherein said first and second electrodes overlap at their intersections to thereby define a plurality of pixel areas; and,
   a plurality of parallel, spaced-apart light-transmissive columns disposed within each of said pixel areas for supporting said light-transmissive insulating layers, said columns extending longitudinally in said first direction.

2. The liquid crystal display as set forth in claim 1, wherein said columns have a monolithic structure.

3. The liquid crystal display as set forth in claim 1, further comprising additional columns disposed between respective adjacent pairs of said first electrodes.

4. The liquid crystal display as set forth in claim 2, further comprising additional columns disposed between respective adjacent pairs of said first electrodes.

5. The liquid crystal display as set forth in claim 1, further comprising a plurality of parallel, spaced-apart, elongated liquid crystal injection holes filled with liquid crystal and linking said liquid crystal layers, said elongated liquid crystal injection holes extending longitudinally in said second direction.

6. The liquid crystal display as set forth in claim 5, wherein said elongated liquid crystal injection holes are disposed between respective adjacent pairs of said second electrodes.

7. The liquid crystal display as set forth in claim 6, wherein said columns have a monolithic structure.

8. The liquid crystal display as set forth in claim 1, further comprising additional columns disposed between respective adjacent pairs of said first electrodes.

9. A liquid crystal display, comprising:
   a substrate;
   a plurality of parallel, spaced-apart first electrodes formed on said substrate, said first electrodes extending longitudinally in a first direction;
   a multilayer structure comprised of alternating light-transmissive insulating layers and liquid crystal layers, respectively, a bottommost layer of said multilayer structure comprising a first light-transmissive insulating layer formed on said first electrodes and exposed portions of said substrate, and an uppermost layer of said multilayer structure comprising a final, light-transmissive insulating layer;
   a plurality of parallel, spaced-apart second electrodes formed on said final light-transmissive insulating layer, said second electrodes extending in a second direction perpendicular to said first direction, wherein said first and second electrodes overlap at their intersections to thereby define a plurality of pixel areas; and,
   a plurality of parallel, spaced-apart, elongated liquid crystal injection holes filled with liquid crystal and linking said liquid crystal layers, said elongated liquid crystal injection holes extending longitudinally in said first direction.

10. The liquid crystal display as set forth in claim 9, wherein said elongated liquid crystal injection holes are disposed between respective adjacent pairs of said first electrodes.

11. The liquid crystal display as set forth in claim 9, further comprising a plurality of parallel, spaced-apart light-transmissive columns disposed between respective adjacent pairs of said second electrodes for supporting said light-transmissive insulating layers, said columns extending longitudinally in said second direction.

12. The liquid crystal display as set forth in claim 11, further comprising additional columns disposed in said pixel areas.

13. The liquid crystal display as set forth in claim 12, wherein said additional columns are made of a light-transmissive material.

14. The liquid crystal display device as set forth in claim 11, wherein said columns have a monolithic structure.

15. The liquid crystal display device as set forth in claim 13, wherein said columns and said additional columns have a monolithic structure.

16. A liquid crystal display, comprising:
   a substrate;
   a plurality of parallel, spaced-apart first electrodes formed on said substrate, said first electrodes extending longitudinally in a first direction;
   a multilayer structure comprised of alternating light-transmissive insulating layers and liquid crystal layers, respectively, a bottommost layer of said multilayer structure comprising a first light-transmissive insulating layer formed on said first electrodes and exposed portions of said substrate, and an uppermost layer of said multilayer structure comprising a final, light-transmissive insulating layer;
   a plurality of parallel, spaced-apart second electrodes formed on said final light-transmissive insulating layer, said second electrodes extending in a second direction perpendicular to said first direction, wherein said first and second electrodes overlap at their intersections to thereby define a plurality of pixel areas; and,
   a plurality of parallel, spaced-apart light-transmissive columns disposed within each of said pixel areas for supporting said light-transmissive insulating layers, said columns extending longitudinally in said second direction.

17. The liquid crystal display as set forth in claim 16, wherein said columns have a monolithic structure.

18. The liquid crystal display as set forth in claim 16, further comprising a plurality of parallel, spaced-apart, elongated liquid crystal injection holes filled with liquid crystal and linking said liquid crystal layers, said elongated liquid crystal injection holes extending longitudinally in said first direction.

19. The liquid crystal display as set forth in claim 18, wherein said elongated liquid crystal injection holes are disposed between respective adjacent pairs of said first electrodes.

20. The liquid crystal display as set forth in claim 19, further comprising additional columns disposed between respective adjacent pairs of said second electrodes, said additional columns being comprised of a light-transmissive material.

21. The liquid crystal display as set forth in claim 18, wherein said columns have a monolithic structure.

22. A liquid crystal display, comprising:
a substrate;
a plurality of parallel, spaced-apart first electrodes formed on said substrate, said first electrodes extending longitudinally in a first direction;
a multilayer structure comprised of alternating light-transmissive insulating layers and liquid crystal layers, respectively, a bottommost layer of said multilayer structure comprising a first light-transmissive insulating layer formed on said first electrodes and exposed portions of said substrate, and an uppermost layer of said multilayer structure comprising a final, light-transmissive insulating layer;
a plurality of parallel, spaced-apart second electrodes formed on said final light-transmissive insulating layer, said second electrodes extending in a second direction perpendicular to said first direction, wherein said first and second electrodes overlap at their intersections to thereby define a plurality of pixel areas; and,
a plurality of parallel, spaced-apart, elongated liquid crystal injection holes filled with liquid crystal and linking said liquid crystal layers, said elongated liquid crystal injection holes extending longitudinally in said second direction.

23. The liquid crystal display as set forth in claim 22, further comprising a plurality of parallel, spaced-apart light-transmissive columns disposed between respective adjacent pairs of said first electrodes for supporting said light-transmissive insulating layers, said columns extending longitudinally in said first direction.

24. The liquid crystal display as set forth in claim 23, wherein said columns have a monolithic structure.

25. The liquid crystal display as set forth in claim 24, further comprising additional columns disposed between respective adjacent pairs of said first electrodes.

26. The liquid crystal display as set forth in claim 25, wherein said elongated liquid crystal injection holes are disposed between respective adjacent pairs of said second electrodes.

* * * * *